(12) United States Patent
Li et al.

(10) Patent No.: US 7,154,888 B1
(45) Date of Patent: Dec. 26, 2006

(54) METHOD FOR CLASSIFYING PACKETS USING MULTI-CLASS STRUCTURES

(75) Inventors: Liang Li, Chapel Hill, NC (US); Thanh Trung Dao, Apex, NC (US); Andrew A. McRae, Berowra (AU); Hugh Nhan, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 895 days.

(21) Appl. No.: 10/072,824

(22) Filed: Feb. 8, 2002

(51) Int. Cl.
*H04L 12/28* (2006.01)
*H04L 12/56* (2006.01)

(52) U.S. Cl. .................................................. 370/389

(58) Field of Classification Search ................. 370/389, 370/392, 395.3, 395.31; 707/2
See application file for complete search history.

(56) References Cited

U.S. PATENT DOCUMENTS

| | | | |
|---|---|---|---|
| 5,027,350 A | 6/1991 | Marshall | |
| 5,473,607 A | 12/1995 | Hausman et al. | |
| 5,509,006 A | 4/1996 | Wilford et al. | |
| 5,852,607 A | 12/1998 | Chin | |
| 5,872,783 A | 2/1999 | Chin | |
| 5,881,242 A | 3/1999 | Ku et al. | |
| 5,917,820 A | 6/1999 | Rekhter | |
| 6,091,725 A | 7/2000 | Cheriton et al. | |
| 6,167,445 A | 12/2000 | Gai et al. | |
| 6,219,706 B1 | 4/2001 | Fan et al. | |
| 6,243,667 B1 | 6/2001 | Kerr et al. | |
| 6,282,546 B1 | 8/2001 | Gleichauf et al. | |
| 6,308,219 B1 | 10/2001 | Hughes | |
| 6,324,656 B1 | 11/2001 | Gleichauf et al. | |
| 6,529,508 B1 * | 3/2003 | Li et al. ..................... | 370/392 |
| 6,643,260 B1 * | 11/2003 | Kloth et al. ................ | 370/235 |

OTHER PUBLICATIONS

U.S. Appl. No. 09/557,480, McRae.
Pankaj Gupta and Nick McKeown, Packet Classification on Mulitple Fields, ACM SIGCOMM '99, Sep. 1999, Harvard University, pp. 1-14.
V. Lakshman and D. Stiliadis, High-Speed Policy-based Packet Forwarding Using Efficient Multi-dimensional Range Matching, 1998, pp. 203-214.

* cited by examiner

Primary Examiner—Kevin C. Harper
(74) Attorney, Agent, or Firm—Cesari and McKenna LLP

(57) ABSTRACT

A technique for classifying a packet in a deterministic number of lookup operations. The technique builds a single "super class" that contains the match criteria for all the rules associated with packet classification. The "super class" is then compiled to produce a series of lookup tables and equivalence sets, including a final lookup table and equivalence set. The final equivalence set is then "post-processed" to associate the entries in the final lookup table with a particular result.

25 Claims, 14 Drawing Sheets

```
              630  640              650
             ┌─┴┐┌─┴┐  ┌───────┴────────┐
    ┌ 620a─ access-list 101 deny   tcp 192.100.0.0  255.255.0.0   eq  smtp
    │ 620b─ access-list 101 permit ip  192.100.0.0  255.255.0.0
600 ┤ 620c─ access-list 101 permit ip  192.101.0.0  255.255.0.0
    │ 620d─ access-list 101 deny   tcp any          any           eq  21
    └ 620e─ access-list 101 deny   udp any          any           eq  80
```

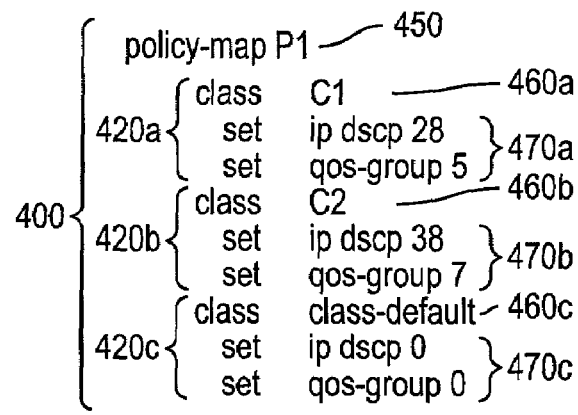
FIG. 4
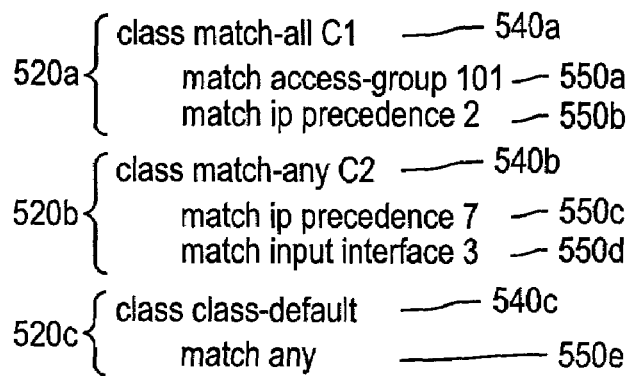
FIG. 5
```
              630  640                650
      ┌ 620a ─ access-list 101 deny    tcp  192.100.0.0   255.255.0.0   eq  smtp
      │ 620b ─ access-list 101 permit  ip   192.100.0.0   255.255.0.0
  600 ┤ 620c ─ access-list 101 permit  ip   192.101.0.0   255.255.0.0
      │ 620d ─ access-list 101 deny    tcp  any           any           eq  21
      └ 620e ─ access-list 101 deny    udp  any           any           eq  80
```
FIG. 6 class S1

| | | | | | |
|---|---|---|---|---|---|
| 920a — match tcp | 192.100.0.0 | 255.255.0.0 | eq | smtp |
| 920b — match ip | 192.100.0.0 | 255.255.0.0 | | |
| 920c — match ip | 192.101.0.0 | 255.255.0.0 | | |
| 920d — match tcp | any | any | eq | 21 |
| 920e — match udp | any | any | eq | 80 |
| 920f — match ip | precedence | 2 | | |
| 920g — match ip | precedence | 7 | | |
| 920h — match input | interface | 3 | | |
| 920i — match any | | | | |

METHOD FOR CLASSIFYING PACKETS USING MULTI-CLASS STRUCTURES

CROSS-REFERENCE TO RELATED APPLICATIONS

The present invention is related to and commonly assigned U.S. patent application Ser. No. 09/557,480 titled, Method for High Speed Packet Classification, which was filed on Apr. 24, 2000, now issued as U.S. Pat. No. 6,970,462.

BACKGROUND OF THE INVENTION

1. Field of the Invention

The invention relates generally to the classification of data packets, and more specifically to the classification of data packets using structures that contain multiple classes.

2. Background Information

In a communications network, there is a well-recognized need to classify information units, such as packets, that are passed between the various network devices (e.g., routers and switches) in the network, in order to support a wide range of applications, such as security control, Class of Service (CoS) and Quality of Service (QoS). Often, in such networks, network devices use access control lists (ACLs) to classify packets for these applications.

An ACL typically comprises an ordered list of rules where each rule defines a pattern (criterion) that is compared against received packets. The pattern could specify a particular source or destination address, a protocol or some other field that is looked for in the packet. For example, the pattern might be defined to look for a specific protocol in the packet's header such as, the Transmission Control Protocol (TCP). The pattern is used to determine if the rule applies to the packet. If the pattern is found in the packet, the rule is said to apply to the packet.

Associated with each rule is an action that specifies the act to be taken if the rule applies. In its simplest form, this action may be to allow the matched packet to proceed towards its destination (i.e., "permit") or to stop the packet from proceeding any further (i.e., "deny"). Conversely, if there is no match to any of the ACL's rules, the action may be to drop the packet (i.e., "a final deny"). In a more sophisticated form, complex policies and filtering rules may be implemented in the ACL to determine the course of the data packet.

Network devices, such as routers or switches, originally have used ACLs for packet filtering, however, as new services, such as QoS and CoS, have been implemented on these devices ACL use has been extended to support these services, as well. But, as algorithms and features have been developed for these services, the classification and action parameters associated with rules contained in an ACL tend to be defined specifically for a particular algorithm or feature associated with the service, rather than for an overall policy that may be associated with the service. To correct this, network devices often include structures that enable packet classification to be specified separately from policy. Two such structures include the class map and the policy map.

A class map is a structure that is used to define a particular packet classification or class. A class map typically comprises a class criterion and one or more match statements. The class criterion usually defines some condition, such as "match any of the following rules" or "match all of the following rules," that applies to the overall class map. The match statement may specify an individual pattern or an entire ACL. If the packet meets the criterion associated with the class, the class is said to apply to that packet.

A policy map is a structure that is used to define the policy parameters or algorithms to be applied to a classified packet. A policy map typically includes one or more classes and one or more action statements associated with each class. The action statements associated with a particular class are performed, if the class applies to the packet being processed.

Typically, a packet is processed by searching for the first class that applies to the packet. The number of match statements involved and the amount of processing time needed to make this determination often depends on the approach taken. For example, one approach would be to run through the list of classes in the policy map starting from the first class in the list and continuing towards the last class in the list until a class is found to apply to the packet. This approach is simple, but is not very efficient. Packets that meet the criteria associated with classes earlier in the list will be processed faster than packets that meet criteria associated with classes that are positioned farther down the list, thus the time it takes to process various packets may vary.

It would be desirable to have a technique that can classify a packet in accordance with a multi-class policy in a manner that is faster than a sequential search and that can complete the processing in a deterministic amount of time regardless of the number of classes in the policy.

SUMMARY OF THE INVENTION

The present invention incorporates a technique for classifying a packet in accordance with a structure that contains multiple classes, such as a policy map, in a manner that is faster than a sequential search and in a deterministic amount of time regardless of the number of classes in the structure. The technique employed by the present invention builds a hierarchical arrangement of lookup tables organized into levels that are used to classify the packet in accordance with the multi-class structure. These lookup tables are built using a "super class" that contains all of the match statements associated with each of the classes contained in the multi-class structure. In addition to the lookup tables, a plurality of equivalence sets, including a final equivalence set, are produced. In one embodiment of the invention, information about which class is associated with which match statement in the super class is saved. The final equivalence set is post-processed using this saved information to associate each entry in the set with a class. This association is kept in a class lookup table that is indexed by the final equivalence set index.

At packet classification time, a packet is divided into sections. Each of the sections is applied to their respective first-level lookup tables to generate an index value that corresponds to the value of the section. These indices are then applied to the next-level lookup tables to generate indices that are then used so select entries in successive levels of lookup tables and so on until a single entry in the final lookup table is selected. The selected final table entry provides an outcome index that is used to index the class lookup table to locate the class associated with the packet.

In another embodiment of the invention, the final equivalence set is used to create one or more results tables that are indexed by an equivalence set index. Each results table may be associated with a particular application. The results table maps the outcome of the packet classification to actions associated with the application. At packet classification time, the packet is applied to the lookup tables to produce an outcome index. This outcome index can then be used by the various applications to index their associated results tables.

BRIEF DESCRIPTION OF THE DRAWINGS

The invention description below refers to the accompanying drawings, of which:

FIG. 4 is an illustration of a policy map that can be used with the present invention;

FIG. 5 is an illustration of a class map that can be used with the present invention;

FIG. 6 is an illustration of an access control list that can be used with the present invention;

FIG. 9 is an illustration of a super class that can be used with the present invention;

DETAILED DESCRIPTION OF AN ILLUSTRATIVE EMBODIMENT

Figure 1:
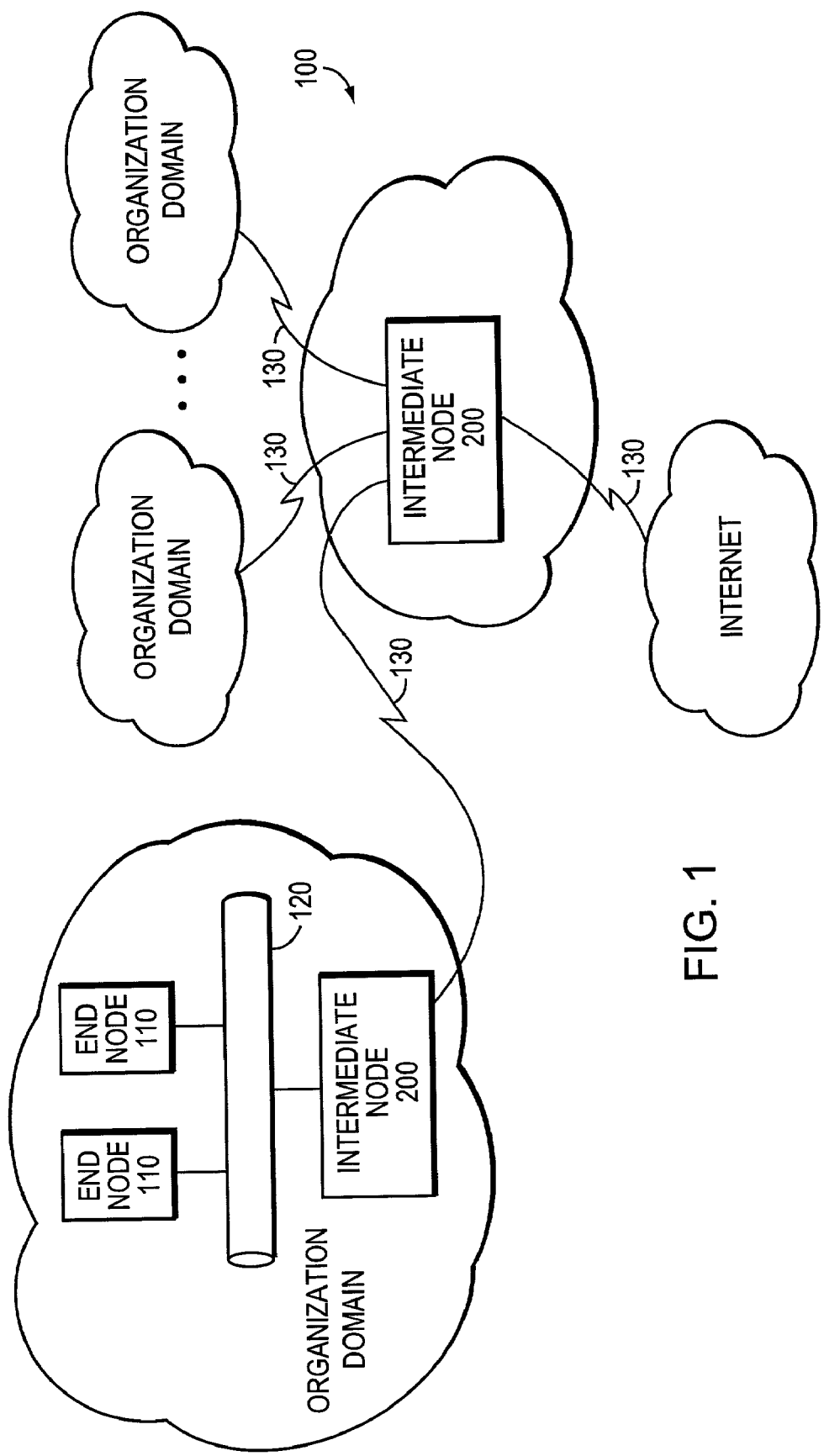
FIG. 1 is a schematic block diagram of a network that can implement the present invention.

FIG. 1 is a schematic block diagram of a computer network 100 that can advantageously implement the present invention. The computer network 100 comprises a collection of communication links and segments connected to a plurality of nodes, such as end nodes 110 and intermediate nodes 200. The network links and segments may comprise local area networks (LANs) 120 and wide area network (WAN) links 130 interconnected by intermediate nodes 200, such as network switches or routers, to form an internetwork of computer nodes. These internetworked nodes communicate by exchanging data packets according to a predefined set of protocols, such as the Transmission Control Protocol/Internet Protocol (TCP/IP) and the Asynchronous Transfer Mode (ATM) protocol.

Figure 2:
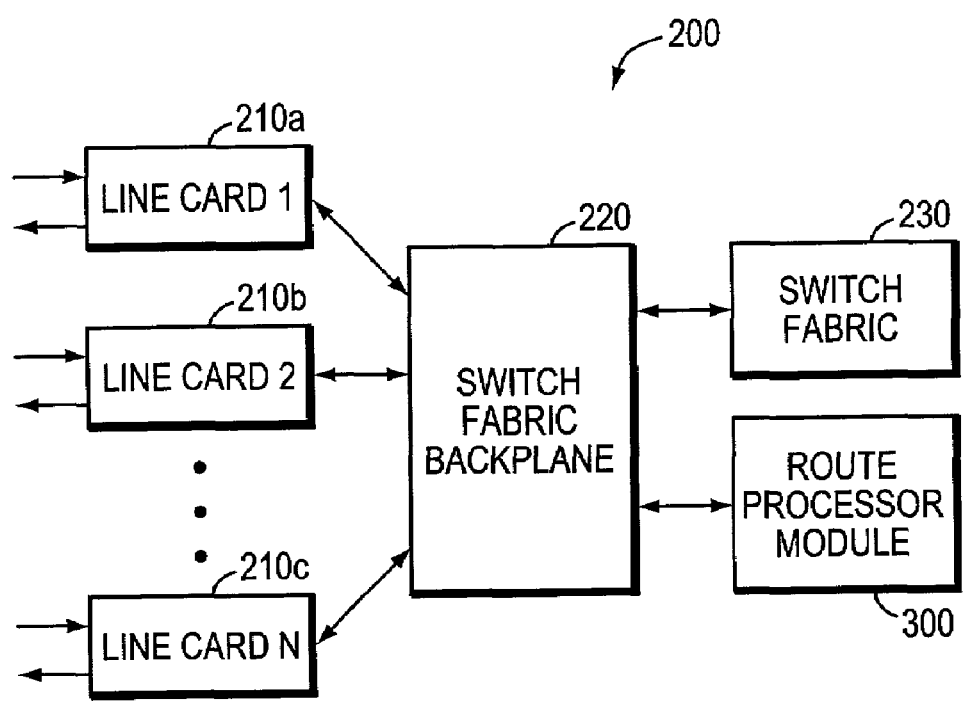
FIG. 2 is a partial schematic block diagram of an intermediate node that can implement the present invention.

FIG. 2 is a partial block diagram of a typical intermediate node (switch) 200 that can advantageously implement the present invention. An example of an intermediate node 200 that could be used in the computer network 100 is the Cisco MGX 8850 IP+ATM Multiservice Switch, available from Cisco Systems, Incorporated, San Jose, California. The MGX 8850 is designed for service providers deploying narrowband and/or broadband services. The MGX 8850 scales from DS0 to OC48c and supports various services, such as frame relay, ATM, Voice over IP, circuit emulation, IP, wireless aggregation, DSL aggregation, ATM service backbones and Virtual Private Networks (VPN's). The intermediate node 200 comprises a plurality of cards including line cards 210, a switch fabric card 230 and a route processor module 300 card interconnected by a switch fabric backplane 220.

The line cards 210 connect (interface) the switch 200 with the network 100. To that end, the line cards 210 receive and transmit data over the network using various protocols, such as OC-48c, DS0, T3 and so on. The line cards 210 are also coupled to the switch fabric backplane 220 and forward data received from the network to the switch fabric backplane 220, as well as transmit data received from the switch fabric backplane 220 to the network.

The switch fabric backplane 220 comprises logic and a backplane that provides an interface between the line cards 210, the switch fabric card 230 and the route processor module card 300. For example, the switch fabric backplane 220 provides interconnections between the cards that allow data and signals to be transferred from one card to another.

Figure 3:
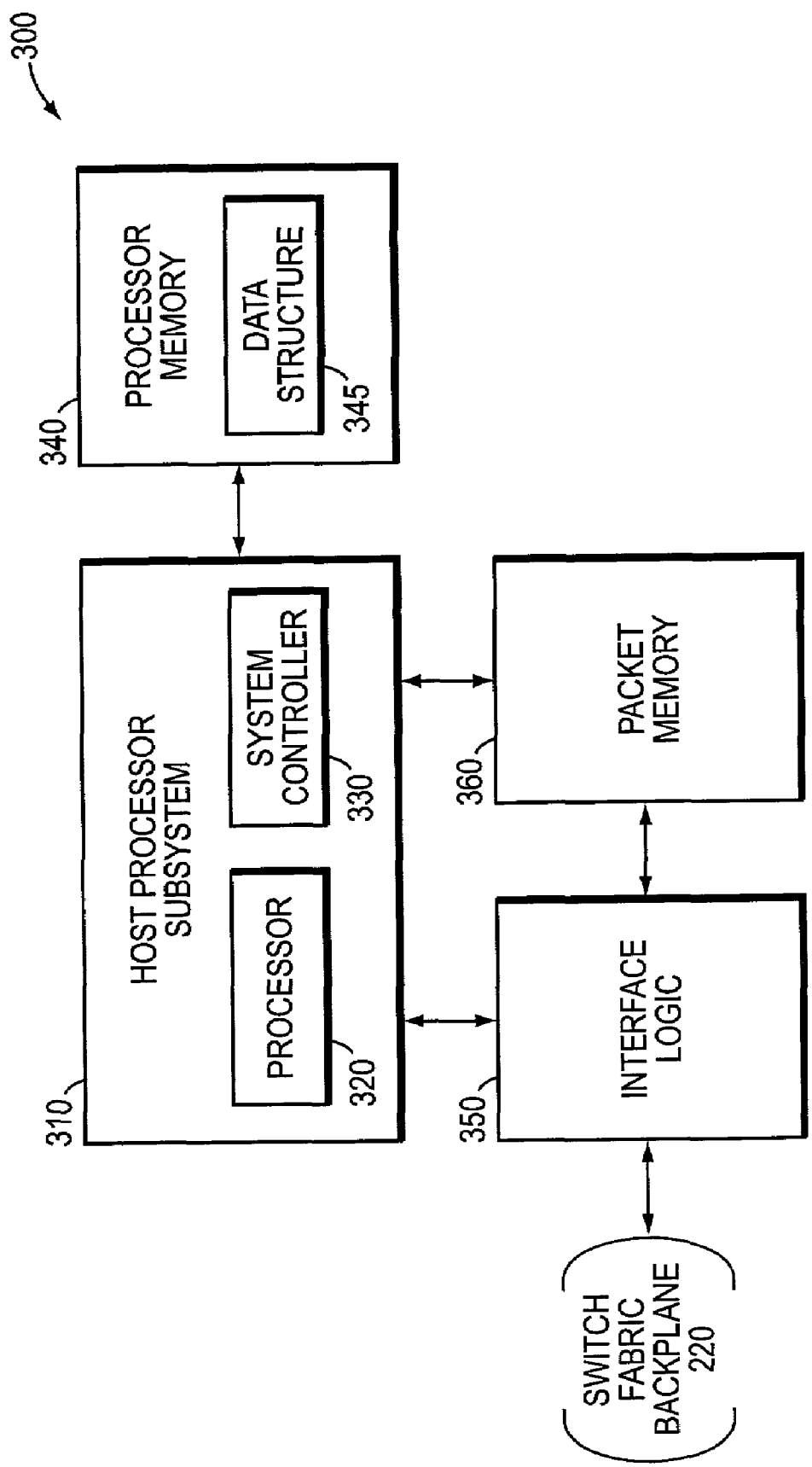
FIG. 3 is a partial schematic block diagram of a route processor module that can implement the present invention.

The switch fabric card 230 is coupled to the switch fabric backplane 220 and comprises switch fabric logic (switch fabric) that is configured to switch data between ports located on the cards coupled to the switch fabric backplane 220. For example, data is sent from a given port to the switch fabric card 230. The switch fabric card 230 applies the data to the switch fabric logic and selects a destination port. The data is then switched to the destination port. The route processor (RP) module 300 is coupled to the switch fabric backplane 220 and is adapted to provide layer 3 processing for incoming packets. FIG. 3 is a partial block diagram of the route processor module 300 comprising a host processor 310 subsystem, processor memory 340, interface logic 350 and packet memory 360. The host processor 310 further comprises a processor 320 coupled to a system controller 330. The processor 320 comprises processing elements and logic that are capable of executing instructions and generating memory requests, such as the MIPS 10000 processor available from Silicon Graphics Incorporated, Mountain View, California. The system controller 330 is preferably embodied in a high performance Application Specific Integrated Circuit (ASIC) which is configured to interface the processor 320 with the processor memory 340 and the packet memory 360.

The processor memory 340 is a computer readable medium that holds executable instructions and data that are used by the processor 320 and enable (adapt) the processor 320 to perform various functions. These functions include methods for performing the present invention. The processor memory 340 comprises one or more memory devices (not shown) that are capable of storing executable instructions and data. Preferably, these memory devices are industry standard memory devices such as, Synchronous Dynamic Random Access Memory (SDRAM) devices available from Micron Technology, Inc., Boise, Id.

The interface logic 350 comprises hardware logic that, inter alia, provides an interface between the switch fabric backplane 220 (FIG. 2), the packet memory 360 and the host processor 310.

The packet memory 360 comprises memory devices (not shown) capable of storing packets received by the interface logic 350. Preferably, these memory devices are industry standard high-speed memory storage devices, such as Rambus Dynamic Random Access Memory (RDRAM) devices available from Rambus, Inc., Los Altos, California.

Broadly stated, packets are received from the network 100 by the line cards 210 and sent to over the switch fabric backplane 220 to the switching fabric 230 for further processing. The switching fabric 230 examines header information contained in the packets and forwards the packets to the appropriate card coupled to the switch fabric backplane 220. Packets destined for the route processor module 300 are received by the interface logic 350 and placed in the packet memory 360. The interface logic 350 informs the host processor 310 of the arrival of a packet. The processor 320 processes the packet in part by issuing requests to the system controller 330 to access the packet data stored in the packet memory 360. Further processing, including classifying the packet, is performed by executing instructions and manipulating data stored in the processor memory 340. The processor memory 340 includes a data structure 345 for storing information that is used to classify the packets. Preferably, this data structure 345 is comprised of a hierarchical arrangement of lookup tables and equivalence sets that are configured using the technique of the present invention.

Suppose, for example, a user wishes to create data structure 345 on a network device 200 for use in classifying packets containing TCP headers. The user might begin by accessing network device 200 and entering a series of commands or statements to define the policy map, class maps and match statements associated with the policy. FIGS. 4–6 illustrates a series of statements the user might enter.

The policy map 400 includes a first statement 450 that declares the policy and names it "P1", several other statements 460a–c that define corresponding classes 420a–c and several action statements 470a–c that are associated with the classes 420. Class 420a ("C1"), class 420b ("C2") and the default class 420c are further defined in the class maps 520a–c (FIG. 5). Class 420c ("class-default") is the default class meaning that it applies to the packet if neither class C1 420a or class C2 420b apply. The action statements 470 define the actions that are taken for a given class if the class is found to apply to the packet being processed. For example, if the packet meets the criteria associated with class C1 420a, the action statements 470a are performed.

The class maps 520a–c associated with the classes defined in statements 460a–c are illustrated in FIG. 5. Each class map includes a first statement 540 that uniquely identifies the class by name ("class name") and specifies the class criterion associated with the class. The class criterion defines the criteria that a packet must match in order for the class to apply to the packet. Associated with each class are one or more match statements 550 that are used along with the class criterion to determine if the packet being processed matches the particular class. For example, match statements 550a and 550b are associated with class C1 520a. The class criterion for class C1 520a is defined as "match-all." Therefore, in order for a packet to match class C1 520a it must contain information that matches the criteria associated with both match statements 550a and 550b. A match statement can be specified as a standalone matching rule containing its own matching criteria (e.g., 550b) or as a match statement that makes reference to an ACL that contains one or more matching rules that define the matching criteria (e.g., 550a which specifies ACL "101").

FIG. 6 illustrates a series of statements that define the ACL "101" that is associated with match statement 550a (FIG. 5). The ACL 600 contains a series of rules 620a–e each of which specify an access group number "101" 630, an action 640 and matching criteria 650. A rule 620 in the access group is considered "matched" if the packet being processed contains information that meets the matching criteria 650 specified in the rule.

Figure 7:
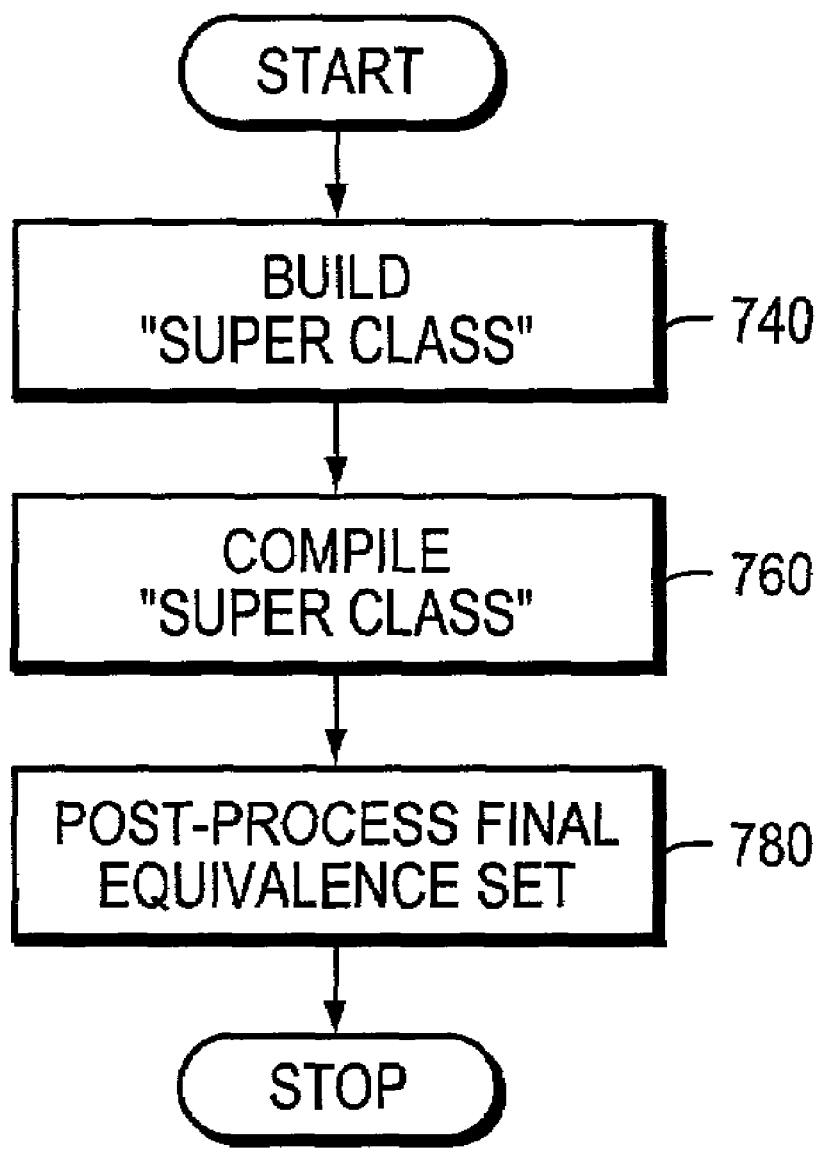
FIG. 7 is a high-level flow diagram of a method that can be used to implement the present invention.
Figure 8:
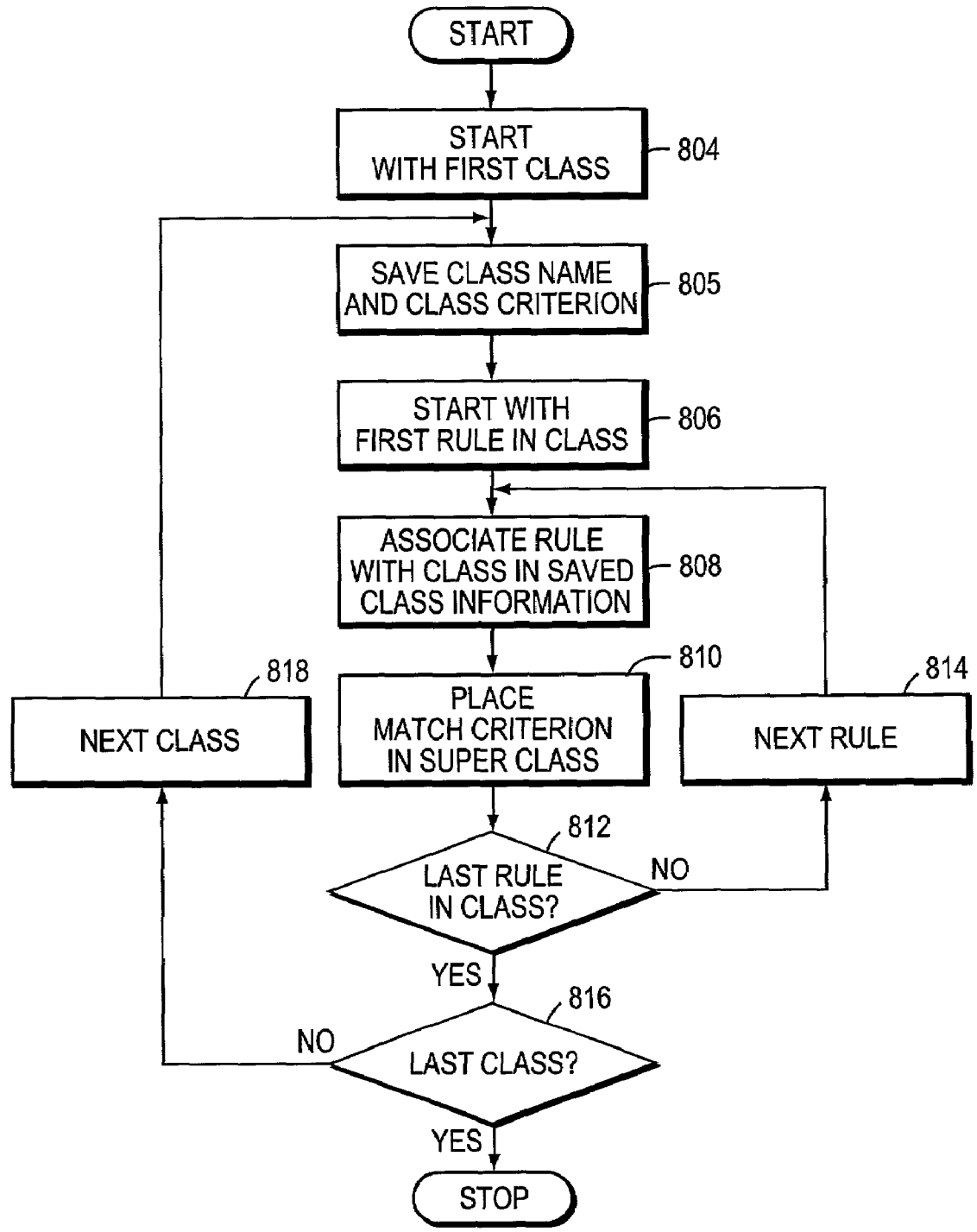
FIG. 8 is a flow diagram of a method that can be used to create a super class that can be used with the present invention.

Now suppose the user wishes to direct network device 200 to create data structure 345 from the information specified in policy map P1 400. FIG. 7 is a high-level flow diagram of a method that network device 200 can use to create data structure 345. At block 740, a single class ("super class") comprising all of the matching rules associated with policy map P1 400 is built. FIG. 8 is a flow diagram of a method that can be used to build the super class for policy map P1 400.

At block 804, network device 200 starts with the first class C1 520a in policy P1 400. At block 805, the device 200 saves the class name i.e., "C1" and class criterion i.e., "match all" associated with C1 520a. Next, at block 806, the network device 200 locates the first matching rule 620a associated with class C1 520a. The network device 200 then associates the rule 620a to the saved class information. Preferably, this association is made by setting a bit corresponding to rule 620a in a bitmap that is associated with the saved class information. At block 810, the device 200 places the match criterion 650 associated with the rule 620a in the super class. Next, the network device 200 determines if the last matching rule in class 520a has been processed, as indicated at block 812. Assuming rule 620a is not the last rule in class C1 520a, the device 200 follows the NO arrow to block 814 where it locates the next matching rule 620b associated with class C1 520a and then proceeds to block 808. Blocks 808–814 are repeated until all of the matching rules associated with class C1 520a have been processed.

When the last rule associated with class C1 520a has been processed, the device 200 proceeds to block 816 where it determines if the class being processed is the last class listed in the policy. Assuming class C1 520a is not the last class in policy P1 400, the device 200 follows the NO arrow to block 818 where the next class 520b listed in policy P1 400 is located. The device 200 then proceeds to block 805. Blocks 805–818 are repeated until all of the classes in P1 400 have been processed.

FIG. 9 illustrates the super class S1 900 that is created when the above method is applied to policy P1 400. The super class S1 900 is comprised of one or more match statements 920. Each match statement 920 represents a matching rule. For example, in super class S1 900, match statements 920a–e correspond to match statement 550a which in turn corresponds to matching rules 620a–e in ACL 600. Likewise, match statement 920f corresponds to matching rule 550b, match statements 920g and 920h correspond to matching rules 550c and 550d, and match statement 920i corresponds to matching rule 550e.

Figure 10:
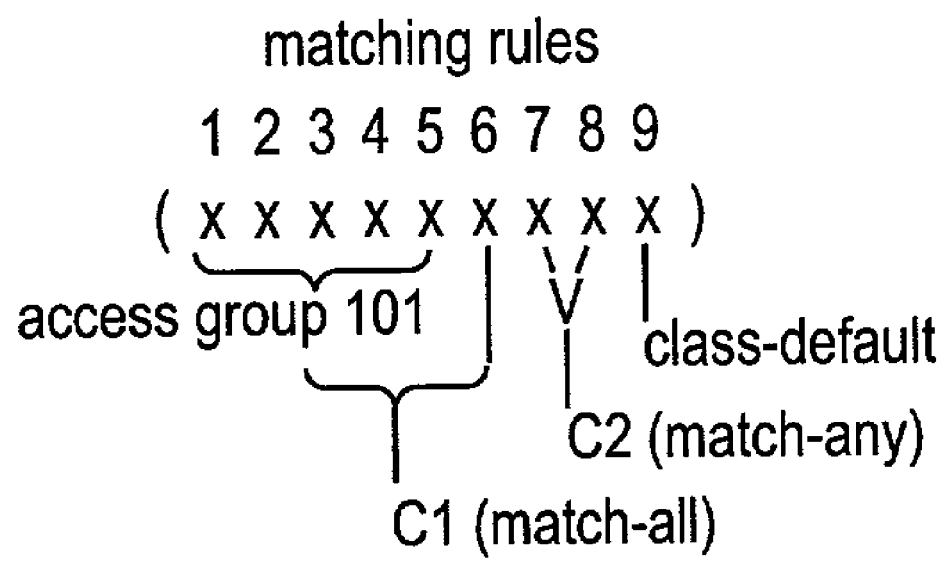
FIG. 10 is an illustration of the mapping of match statements and their associated classes for policy P1.

FIG. 10 illustrates the relationship between the matching rules and their associated classes for policy P1 400. Class C1 520a is associated with matching rules 1 through 5 corresponding to matching rules 620a–e from ACL "101" 600 and rule 6 corresponding to matching rule 550b. Likewise, class C2 520b is associated with rules 7 and 8 corresponding to matching rules 550c and 550d and the default class is associated with rule 9 corresponding to its inherent definition as a matching rule whose criteria is "match any."

The class criteria associated with a class can be derived from the class information that is saved. The class criteria include the class criterion as it applies to the rules associated with the class. For example, the class criterion for class C2 520*b* is "match any" and the rules associated with this class are rules 7 and 8. Thus, the class criteria for class C2 520*b* is "match any rule 7 through 8." The following table illustrates the class name and class criteria for the classes associated with policy P1 400:

TABLE 1

| Class Name | Class Criteria |
| --- | --- |
| C1 | match rule 6 and any rule 1 through 5 |
| C2 | match any rule 7 through 8 |
| default class | match rule 9 |

Figure 11:
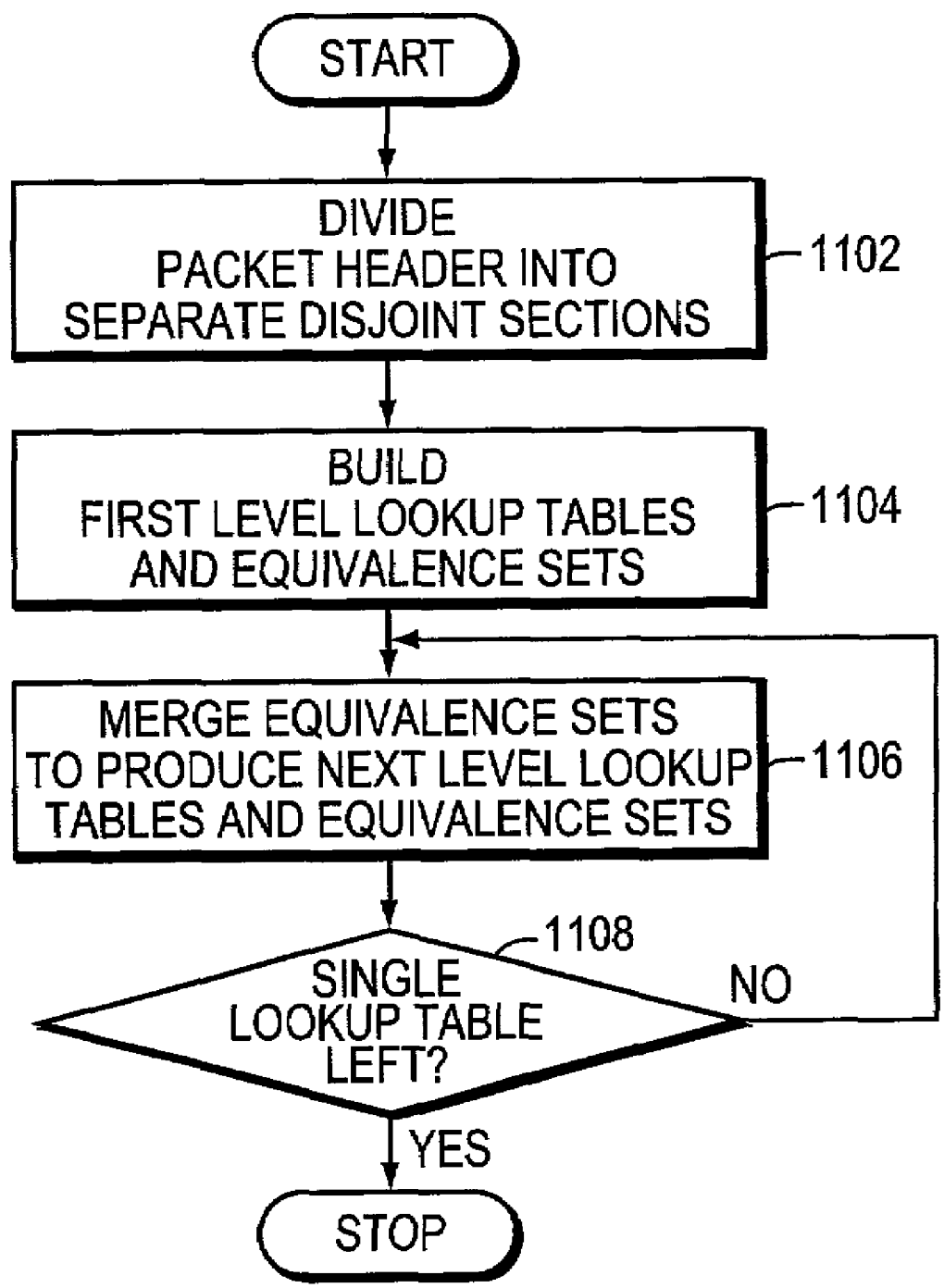
FIG. 11 is a high-level flow diagram of a method that can be used to create lookup tables and their associated equivalence sets that can be used with the present invention.

At block 760 (FIG. 7), the "super class" 900 is compiled to produce a hierarchical arrangement of lookup tables and equivalence sets. FIG. 11 is a high-level flow diagram of a method that can be used to compile the super class 900.

At block 1102, a template of the packet header used to classify the packet is divided into separate disjoint sections. Next, a first-level lookup table and equivalence set is built for each of these sections, as indicated at block 1104. At blocks 1106–1108, the first-level equivalence sets are merged to produce a second level of equivalence sets and lookup tables and the second-level equivalence sets are merged to produce a third level of equivalence sets and lookup tables and so on until a single lookup table and equivalence set is produced, as indicated at block 1108.

Figure 12:
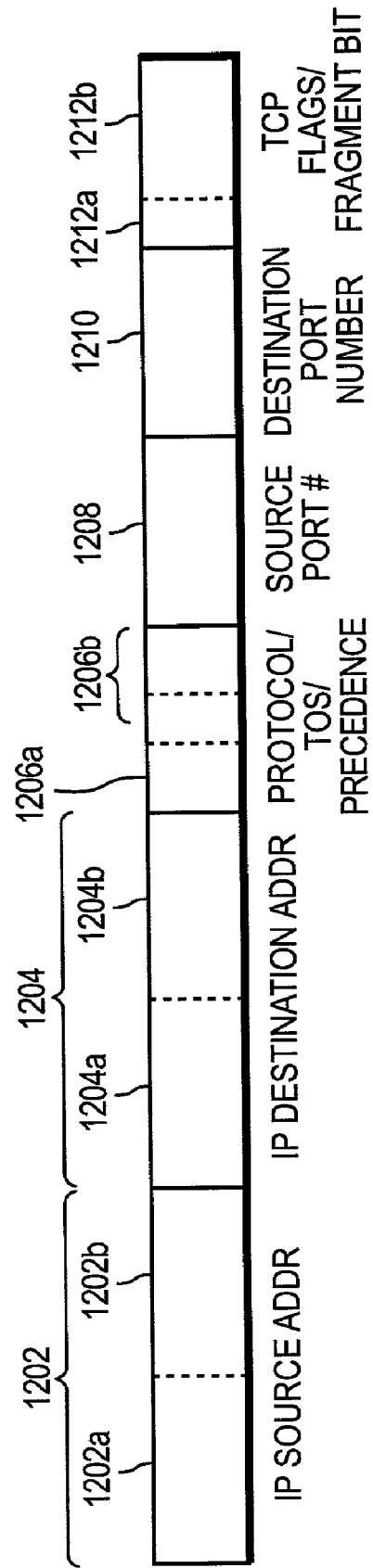
FIG. 12 illustrates an example of how a packet header may be divided into sections for use in forming first-level lookup tables and equivalence sets that can be used with the present invention.

FIG. 12 illustrates how a TCP packet header 1200 may be divided into separate disjoint sections. Packet header 1200 defines a plurality of fields including an Internet Protocol (IP) source address field 1202, an IP destination address field 1204, a protocol field 1206*a*, a type of service (TOS)/precedence field 1206*b*, a source port number field 1208, a destination port number field 1210, a fragment bit field 1212*a* and a TCP flags field 1212*b*. Though the size of each section can vary, preferably, the length of each section is equal-sized. For example, the TCP header in FIG. 12 is divided into eight 16-bit equal-length sections. The IP source address 1202 is divided into an upper IP address section 1202*a* and a lower IP address section 1202*b*. Likewise, the IP destination address is divided into upper 1204*a* and lower 1204*b* IP address sections. Some smaller fields such as the protocol 1206*a* and TOS/precedence 1206*b* field are grouped together to form a 16-bit section. Likewise, the TCP flags field 1212*b* is combined with the IP Fragment bit 1212*a* to form a 16-bit section.

Taking one of these sections, such as the first 16 bits of the IP source address, and applying it to the rules associated with policy map P1 400, the following rule set can be formed where "0.0" represents "any value":

TABLE 2

| Rule Number | Value | Mask |
| --- | --- | --- |
| 1 | 192.100 | 255.255 |
| 2 | 192.100 | 255.255 |
| 3 | 192.101 | 255.255 |
| 4 | 0.0 | 0.0 |
| 5 | 0.0 | 0.0 |
| 6 | 0.0 | 0.0 |

TABLE 2-continued

| Rule Number | Value | Mask |
| --- | --- | --- |
| 7 | 0.0 | 0.0 |
| 8 | 0.0 | 0.0 |
| 9 | 0.0 | 0.0 |

From this rule set, an "equivalence set" can be formed. Basically, an equivalence set is a set of unique values that exist across all rules for a particular packet header section. For each entry in the equivalence set, an indication (matching rule bitmap) is kept for those rules associated with the entry, the rationale being that a packet section value may appear in more than one rule. For example, policy P1 400 contains nine rules, thus each rule bitmap is nine bits in length (i.e., one bit for each rule). The 192.100/255.255 value appears in both rules 1 and 2 above, thus, the rule bitmap value associated with this value is "110000000". By using a bitmap, rules associated with each equivalence set entry may be tracked. Each unique matching rule bitmap value is further assigned an equivalence set index value. So for the example above, the following equivalence set, shown in the following table, is created:

TABLE 3

| Packet Section Value | Equivalence Set Index | Match Rules (bitmap) 1 2 3 4 5 6 7 8 9 |
| --- | --- | --- |
| 0.0–192.99 | 0 | 0 0 0 1 1 1 1 1 1 |
| 192.100 | 1 | 1 1 0 1 1 1 1 1 1 |
| 192.101 | 2 | 0 0 1 1 1 1 1 1 1 |
| 192.102–255.255 | 0 | 0 0 0 1 1 1 1 1 1 |

By comparing table 2 with table 3, one can see that compression has taken place in that out of the nine rules within this section there are only three possible outcomes (i.e., equivalence set index entries 0, 1 and 2). Thus, after determining how many unique intervals there are in the section value range from zero to 65535, the preliminary equivalence set reduces the original rules down to a minimal data set. This concept is used to build the first-level lookup tables that map the 16-bit section to a smaller index value.

Figure 13:
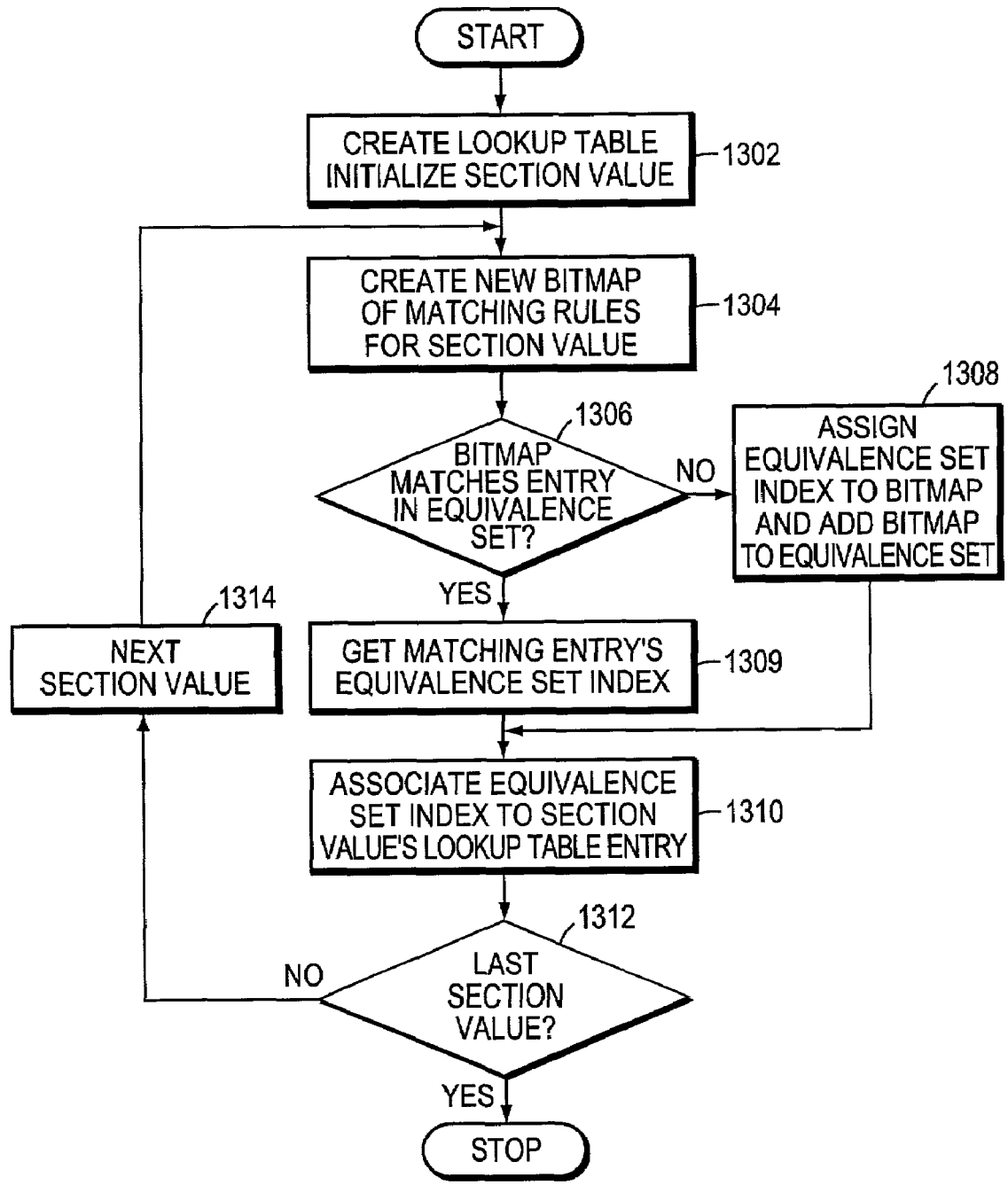
FIG. 13 is a flow diagram of a method that can be used to create a first-level lookup table and equivalence set that can be used with the present invention.

FIG. 13 illustrates a method that can be used to build a first-level lookup table and equivalence set for a section. Basically, the method iterates through all possible section values and associates the section value with an equivalence set index and a set of matching rules (represented as a bitmap). For a section that is 16 bits in length, the method would iterate using section values from zero to 65535 associating each section value with an equivalence set index and a set of matching rules.

At block 1302, the lookup table is created and the section value is initialized to a starting value, preferably zero. At block 1304, a new bitmap that represents the matching filter rules associated with the section value is created. A more detailed description as to how this new bitmap is created is described below. At decision block 1306, the equivalence set is searched to determine if an entry exists that that matches the new bitmap. If a matching entry is not found, the method proceeds to block 1308, where the new bitmap is assigned a new equivalence set index and placed in the equivalence set at the newly assigned index. Otherwise, the process proceeds to block 1309 where the equivalence set index associated with the matching value is fetched. At block 1310, the equivalence set index is associated with the lookup table entry associated with the section value. At decision block 1312, a check is performed to determine if the section value is the last section value to be processed. If not, the next section value is calculated as indicated at block 1314 and the process proceeds to block 1304. Blocks 1304 to 1314 are repeated until all of the section values from the starting value to the last value have been processed.

Figure 14:
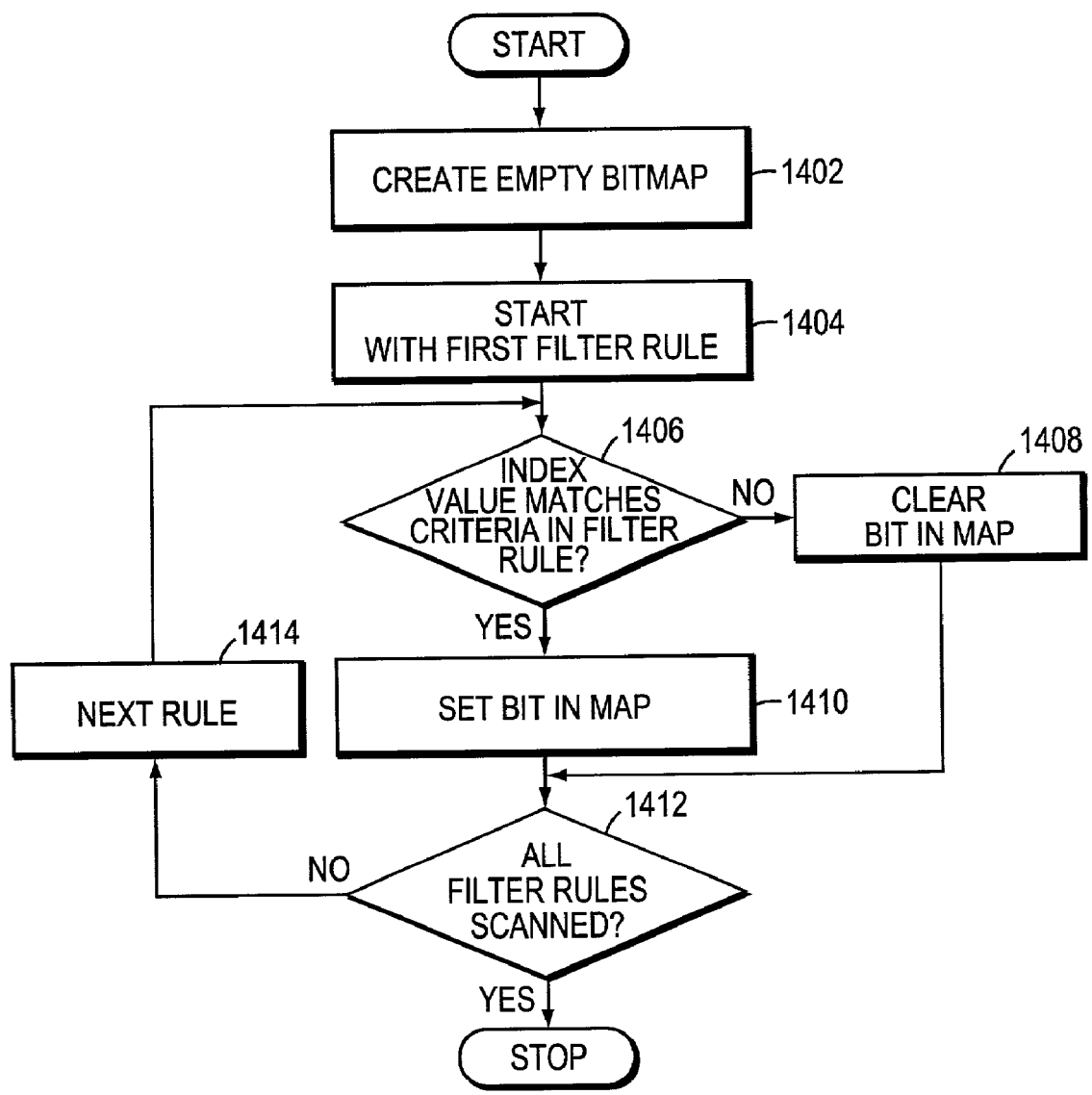
FIG. 14 is a flow diagram of a method that can be used to create a matching rule bitmap associated with a section value that can be used with the present invention.

FIG. 14 illustrates a flow diagram that can be used to create a matching rule bitmap for a given section value from the matching rules contained in the super class. At block 1402, a bitmap is created. Preferably, this bitmap comprises at least one bit for each of the matching rules. Starting with the first matching rule, as indicated at block 1404, the section value is compared to the matching rule's criteria to determine if the section value matches the rule criteria (i.e., the rule applies to the particular section value), as indicated at decision block 1406. If the rule applies, the method proceeds to block 1410 where the bit associated with the rule in the bitmap is set; otherwise, the method proceeds to block 1408 where the associated bit is cleared. A check is then performed to determine if all of the matching rules have been processed, as indicated at decision block 1412. If not, the process locates the next matching rule, as indicated at block 1414, and proceeds to decision block 1406. Blocks 1406–1414 are repeated until all of is the matching rules have been processed.

Table 4 illustrates the first-level lookup table and equivalence set that is created when the above methods are applied to the packet header section associated with the upper 16 bits of the source IP address for policy P1 400.

TABLE 4

| Packet Header Section Value | Equivalence Set Index | Match Rules (bitmap) 1 2 3 4 5 6 7 8 9 |
|---|---|---|
| 0.0 to 192.99 and 192.102–255.255 | 0 | 0 0 0 1 1 1 1 1 1 |
| 192.100 | 1 | 1 1 0 1 1 1 1 1 1 |
| 192.101 | 2 | 0 0 1 1 1 1 1 1 1 |

The above methods are applied to create the first-level lookup tables and equivalence sets for each of the eight sections associated with the packet's TCP header. Table 5 illustrates the first-level lookup table and equivalence set that is created when the above methods are applied to the section associated with the 1-byte TOS/precedence field combined with the 1-byte incoming interface field for policy P1 400.

TABLE 5

| Packet Header Section Value | Equivalence Set Index | Match Rules (bitmap) 1 2 3 4 5 6 7 8 9 |
|---|---|---|
| 0 to 1.255 except 0.3 and 1.3 and 3.0 to 6.255 except y.3 where y = 3 to 6 and 8.0 to 255.255 except z.3 where z = 9 to 255 | 0 | 1 1 1 1 1 0 0 0 1 |
| x.3 where x = 0 to 1 and y.3 where y = 3 to 6 and z.3 where z = 8 to 255 | 1 | 1 1 1 1 1 0 0 1 1 |
| 2.0–2.255 except 2.3 | 2 | 1 1 1 1 1 1 0 0 1 |
| 2.3 | 3 | 1 1 1 1 1 1 0 1 1 |
| 7.0–7.255 except 7.3 | 4 | 1 1 1 1 1 0 1 0 1 |
| 7.3 | 5 | 1 1 1 1 1 0 1 1 1 |

At block 1106 (FIG. 11), the eight separate first-level equivalence sets are merged (combined) through a technique known as "cross-producting" to create a set of four next-level (e.g., second-level) lookup tables and equivalence sets. Cross-producting is a technique whereby two entities are logically ANDed to produce a cross-product. For example, assume a bitmap B1 contains the value "00111" and a bitmap B2 contains the value "11110". The cross-product of these bitmaps is calculated by logically ANDing the value of B1 (i.e., 00111) with the value of B2 (i.e., 11110) which results in the value "00110".

Figure 15:
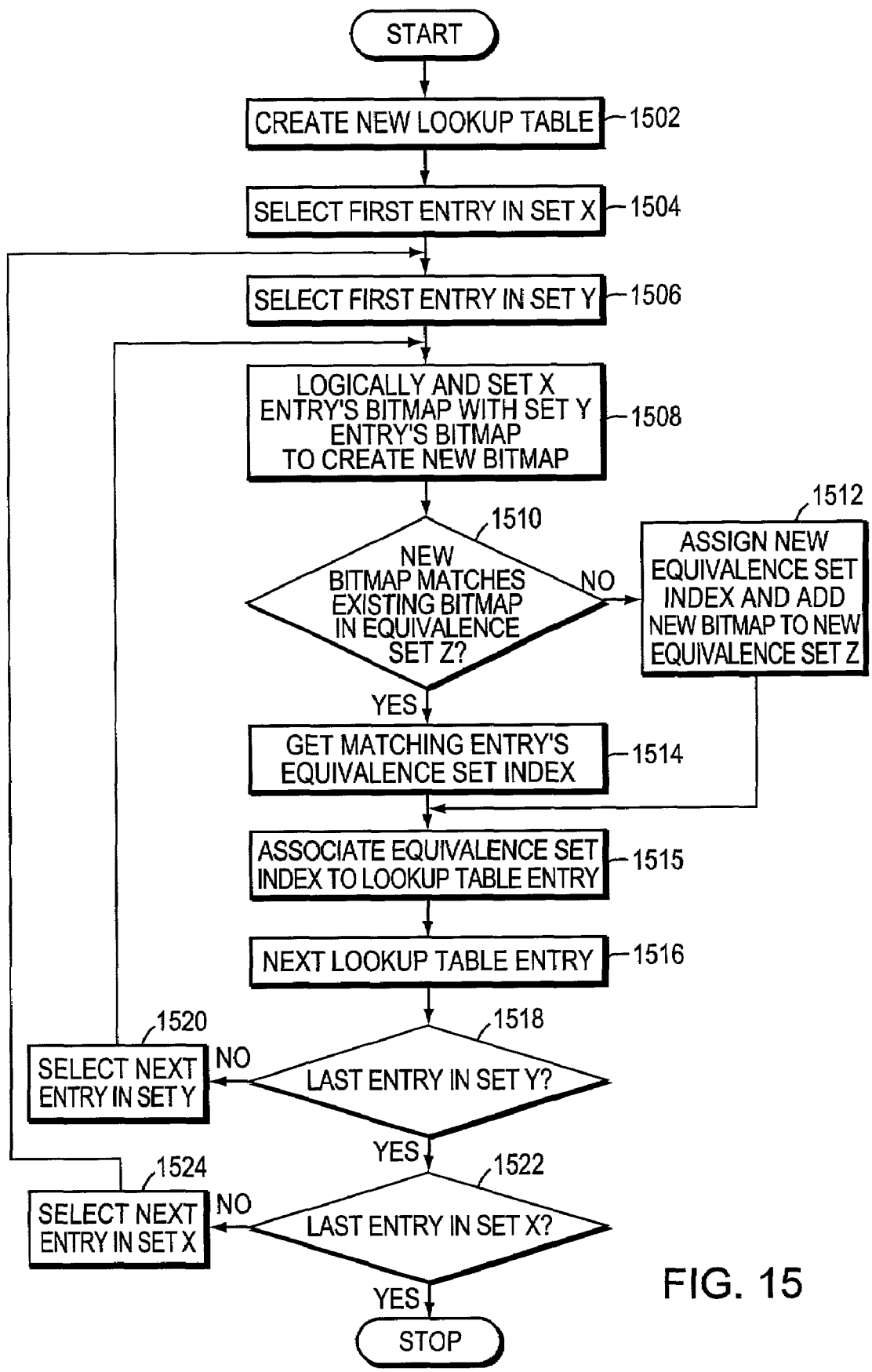
FIG. 15 is a flow diagram of a method for merging equivalence sets to create next-level lookup tables and equivalence sets that can be used with the present invention.

FIG. 15 is a logic diagram of a method that can be used to merge two equivalence sets (e.g., "X" and "Y") to produce a next-level lookup table and new equivalence set (e.g., "Z"). At block 1502, the next-level lookup table is created and the first entry in the table is selected. Preferably, this table is organized as a two-dimensional array the size of which is the product of the sizes of the two equivalence sets being merged. At block 1504, the first entry in the first equivalence set "X" is selected. Likewise, at block 1506 the first entry in the second equivalence set "Y" is selected. At block 1508, the matching rule bitmap associated with the selected entry in set X is logically ANDed with the bitmap associated with the selected entry in set Y to produce a new bitmap that is the cross-product of these two entries. At decision block 1510, the new equivalence set "Z" is searched to determine if an entry exists that that matches the new bitmap. If a matching entry is not found, the method proceeds to block 1512, where the new bitmap is assigned a new equivalence set index and placed in the new equivalence set at the newly assigned index. Otherwise, the process proceeds to block 1514 where the equivalence set index associated with the matching value if fetched. At block 1515, the equivalence set index is associated with the selected lookup table entry. At block 1516, the next entry in lookup table is selected. A check is then performed to determine if the last entry in set Y has been processed, as indicated at decision block 1518. If not, at block 1520 the next entry in set Y is selected and the process proceeds to block 1508. Otherwise, at decision block 1522, a check is performed to determine if the last entry in set X has been processed. If not, the next entry in set X is selected and the process proceeds to block 1506.

Blocks 1506 through 1524 are repeated until all of the entries in both set X and set Y have been processed. Table 6 illustrates the resultant second-level lookup table and equivalence set for policy P1 400 that was created by applying the above method to the first-level lookup tables illustrated in tables 4 and 5 above.

TABLE 6

| Lookup Table Entry | Equivalence Set Index | Match Rules (bitmap) 1 2 3 4 5 6 7 8 9 |
|---|---|---|
| [0, 0] | 0 | 0 0 0 1 1 0 0 0 1 |
| [0, 1] | 1 | 0 0 0 1 1 0 0 1 1 |
| [0, 2] | 2 | 0 0 0 1 1 1 0 0 1 |
| [0, 3] | 3 | 0 0 0 1 1 1 0 1 1 |
| [0, 4] | 4 | 0 0 0 1 1 1 1 0 1 |
| [0, 5] | 5 | 0 0 0 1 1 0 1 1 1 |
| [1, 0] | 6 | 1 1 0 1 1 0 0 0 1 |
| [1, 1] | 7 | 1 1 0 1 1 0 0 1 1 |
| [1, 2] | 8 | 1 1 0 1 1 1 0 0 1 |
| [1, 3] | 9 | 1 1 0 1 1 1 0 1 1 |
| [1, 4] | 10 | 1 1 0 1 1 1 1 0 1 |
| [1, 5] | 11 | 1 1 0 1 1 0 1 1 1 |
| [2, 0] | 12 | 0 0 1 1 1 0 0 0 1 |
| [2, 1] | 13 | 0 0 1 1 1 0 0 1 1 |

TABLE 6-continued

| Lookup Table Entry | Equivalence Set Index | Match Rules (bitmap) 1 2 3 4 5 6 7 8 9 |
|---|---|---|
| [2, 2] | 14 | 0 0 1 1 1 1 0 0 1 |
| [2, 3] | 15 | 0 0 1 1 1 1 0 1 1 |
| [2, 4] | 16 | 0 0 1 1 1 1 1 0 1 |
| [2, 5] | 17 | 0 0 1 1 1 0 1 1 1 |

In essence, cross-producting calculates the intersection on the regions covered by the two equivalence sets, and creates a new equivalence set representing all the possible outcomes of the combination of any values in the two packet fields. The above-described cross-producting method is applied continually until a single final lookup table and equivalence set is produced.

Figure 16:
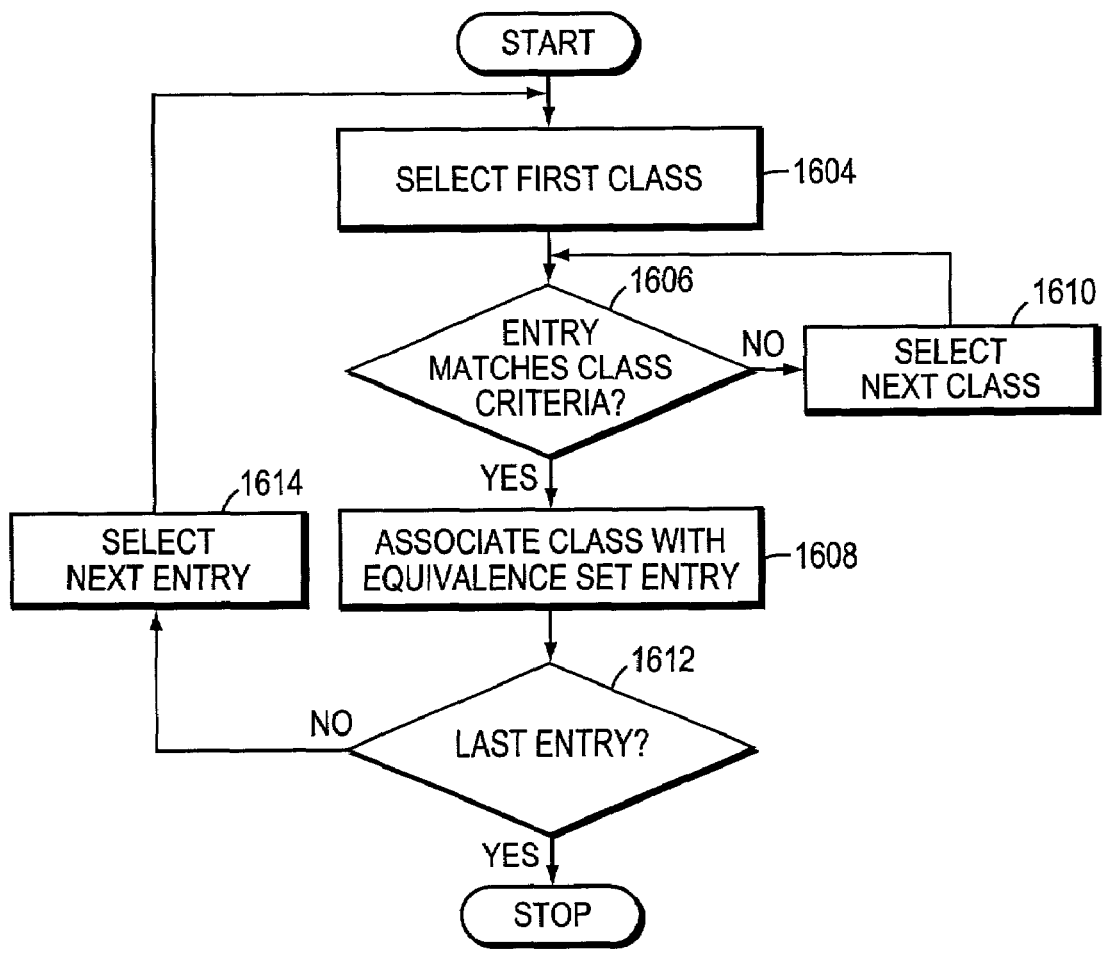
FIG. 16 is a flow diagram of a method that can be used to post-process a final equivalence set to associate the entries with class information that can be used with the present invention.

For example, applying the above method to the super class 900, all eight first-level equivalence sets are merged to form four second-level tables and equivalence sets. Likewise, these second-level equivalence sets are merged to form two third-level tables and equivalence sets. These third-level equivalence sets, in turn, are merged to form a single fourth-level final lookup table and equivalence set. The end result is a 4-level hierarchy of lookup tables and a final equivalence set that can be used to classify a packet according to the matching rules in the super class. FIG. 16 is an illustration of this merging process as applied to the super class 900.

The final lookup table and equivalence set provides all the theoretical possible combinations of rules given any packet header values, and for any of these possible out-comes, there is a bitmap indicating which rules are matching. A sample of indices in the final equivalence set is as follows:

TABLE 7

| Lookup Table Entry | Match Rules (bitmap) 1 2 3 4 5 6 7 8 9 |
|---|---|
| 12 | 0 1 0 1 1 1 0 0 1 |
| 13 | 0 0 1 1 1 0 1 0 1 |
| 27 | 0 1 0 1 1 0 0 0 1 |

At block 780 (FIG. 7), the final equivalence set is "post-processed." Preferably this post-processing includes associating each entry in the set with one or more classes. This association can be established by matching the particular entry with the class information saved earlier and saving a pointer to the class in an array that is indexed by the final equivalence set index. FIG. 16 is a flow diagram of a method that can be used to associate a final equivalence set entry with a particular class. Assume network device 200 uses this method to associate final equivalence set entries 12 and 13 to a particular class. At block 1604, the device 200 starts with the first class 520*a* in the class information that was saved. Next, at decision block 1606, the device 200 determines if the rules represented in the selected final table entry's bitmap matches the class criteria associated with the selected class C1 520*a*. The class criteria includes the class criterion, e.g., "match all", "match any", etc. and the rules associated with the class. Assuming, the bitmap associated with set entry 12 matches the criteria associated with the selected class C1 520*a* the device 200 proceeds to block 1608. At block 1608, the processor associates the class with the selected final table entry by placing a pointer to the class map in a table that is indexed by the equivalence set index. At decision block 1612, the device 200 determines if table entry 12 is the last entry in the table. Assuming that it is not, the device 200 follows the NO arrow to block 1614 where the next entry in the table is selected (i.e., entry 13). The device 200 then proceeds to block 1604.

At block 1604, the device 200 selects class C1 520*a* as previously described. Next, at decision block 1606, the device 200 determines if the rules represented in the bitmap associated with table entry 13 matches the class criteria associated with class C1 520*a*. Assuming the bitmap does not match the class criteria, the device 200 proceeds to block 1610 where the next class C2 520*b* in the saved class information is selected. The device 200 then proceeds to block 1606 where it determines if the rules represented in the bitmap associated with entry 13 matches the class criteria associated with class C2 520*b*. Assuming the bitmap matches class C2's criteria, the device 200 proceeds to block 1608 where the class C2 520*b* is associated with table entry 13 as previously described. Blocks 1604–1614 are repeated until all of the entries in the final equivalence set are processed.

At packet classification time, a packet header associated with the packet being classified is preferably divided into sections, as described above. Each of the sections is applied to their corresponding first-level lookup tables to generate an index value that corresponds to the value of the section. These indices are then applied to the second-level lookup tables to generate indices that are then used so select entries in the next-level tables, and so on until a single entry in the final lookup table is selected. The selected final table entry generates an equivalence set index value (outcome index) that can then be used to determine the class map and the matching rules that are associated with the packet header.

It should be noted that since the final equivalence set is the only equivalence set used at packet classification time, once all of the lookup tables have been built, the equivalence sets associated with the levels other than the final level need not be retained.

In the above-described method, each final equivalence set entry is associated with the first matching class i.e., the first class where the entry matches the criteria associated with the class, in the saved class information. However, this is not a limitation of the invention. Rather in another embodiment of the invention, the final equivalence set entry is associated with all of the matching classes in the saved class information. In this embodiment, the saved class information is scanned to identify all the classes where the entry matches the class's criteria. The entry is then associated with all of the identified classes.

In one embodiment of the invention, the lookup tables and equivalence sets are built into hardware such as a flash memory, a content-addressable memory (CAM) or an ASIC, that is accessible to the hardware that is involved in the classifying of a network packet such as, the processor 320. In this embodiment, the eight first-level lookups operations are done in parallel by the hardware, and the results are fed directly to the second-level lookups and so on. Thus, in this embodiment a packet can be classified in a time of only four memory lookups thereby expediting the classification process.

In another embodiment of the invention, the post-processing of the equivalence set entry's bitmap associated with the outcome index is performed at the time the packet is classified. In this embodiment, the outcome index is used to select a corresponding entry in the final equivalence set. The bitmap corresponding to the selected final equivalence set entry is parsed using the saved class information to determine which classes are associated with the packet.

In another embodiment of the invention, the final equivalence set bitmaps are post-processed by various applications running on the network device to produce one or more "results tables" associated with the particular application. A results table is a data structure that maps (associates) an outcome index value to results associated with a particular application. When a packet is applied to the lookup tables, the outcome index produced is used by the various applications to lookup a variety of different results in the results tables. Thus, the packet need only be applied to the lookup tables once. Thereafter, each of the applications can use the packet's outcome index to determine the particular results that apply to the packet.

For example, for filtering security ACLs, the result desired might be to identify the first matching rule associated with a packet. In the above-described embodiment, the application that performs security ACL processing post-processes the final equivalence set bitmaps to build a results table that is indexed by an outcome index value and contains a pointer to the first matching rule associated with the outcome index value. At packet classification time, the application applies the packet's outcome index value to this results table to locate the first matching rule associated with the packet.

Likewise, for QoS, the result desired might be to identify the first matching class associated with a packet. The application that performs QoS processing post-processes the final equivalence set bitmaps to determine which classes apply to each outcome index value, and consequently generates a results table indexed by an outcome index value. At packet classification time, the outcome index value is applied to the results table to locate an entry that contains a pointer to the first matching class associated with the packet.

In another embodiment of the invention, the lookup tables and final equivalence set are generated on a remote device and transferred to the network device that performs the actual packet classification. In this embodiment, the remote device generates the super class and compiles the super class to generate the lookup table hierarchical arrangement and final equivalence set. The lookup tables along with the final equivalence set is then transferred to the target network device that is configured to perform the actual packet classification using this information. The remote device could be another network device or a computer system, such as a server, that is capable of implementing the inventive technique. The lookup tables and final equivalence set could be transferred to the target network device by downloading the information to the device or by other means, such as via a removable disk.

In summary, the present invention incorporates a technique that enables packets to be quickly and efficiently classified using access control lists that contain class and policy information. It will be apparent, however, that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for generating lookup tables and a final equivalence set for use in classifying a network packet in accordance with a policy that specifies one or more classes, each class containing one or more match statements, the match statements being one of a stand-alone matching rule and a matching rule in an access control list (ACL) defining one or more matching rules, the method comprising the steps of:

generating a super class that contains all of the matching rules associated with the classes specified by the policy and that contains for each class a class name that identifies the class, a class criterion associated with the class, and a bitmap representing the matching rules associated with the class;

converting the matching rules of the super class into a single, hierarchical arrangement of lookup tables and associated equivalence sets, the hierarchical arrangement having a plurality of levels including a first level and a final level, the final equivalence set being associated with the final level.

2. A method for generating lookup tables and a final equivalence set for use in classifying a network packet in accordance with a policy that specifies one or more classes, each class containing one or more match statements, the match statements being one of a stand-alone matching rule and a matching rule in an access control list (ACL) defining one or more matching rules, the method comprising the steps of:

generating a super class that contains all of the matching rules associated with the classes specified by the policy; and converting the matching rules of the super class into a single, hierarchical arrangement of lookup tables and associated equivalence sets, the hierarchical arrangement having a plurality of levels including a first level and a final level;

generating a first-level lookup table and a first-level equivalence set for a network packet section using the matching rules of the super class;

merging the first-level equivalence sets to produce one or more next-level lookup tables and next-level equivalence sets; and merging the equivalence sets for each level to produce one or more next-level lookup tables and next-level equivalence sets until a lookup table and equivalence set associated with final level is produced.

3. The method of claim 2 wherein the step of generating a super class comprises the step of:

saving class information associated with each class.

4. The method of claim 2 wherein each network packet section is associated with a value and the step of generating the first-level lookup tables and first-level equivalence sets comprises the steps of:

creating a bitmap that represents the matching rules associated with a respective network packet section's value;

determining if the bitmap matches an entry in the first-level equivalence set and, if so, assigning an equivalence set index value associated with the matching entry to the bitmap, otherwise, assigning a new equivalence set index value to the bitmap and placing the bitmap in the equivalence set; and associating the equivalence set index value with the first-level lookup table entry associated with the respective network packet section's value.

5. The method of claim 2 wherein the step of merging the equivalence sets for each level to produce one or more next-level lookup tables and next-level equivalence sets, comprises the steps of:

a) calculating the cross-product of a first bitmap associated with a first equivalence set and a second bitmap associated with a second equivalence set to produce a third bitmap;

b) determining if the third bitmap matches an entry in the next-level equivalence set and, if so, assigning an equivalence set index value associated with the matching entry to the third bitmap, otherwise, assigning a new equivalence set index value to the third bitmap and placing the third bitmap in the equivalence set;

c) associating a next-level lookup table entry with the equivalence set index value; and d) repeating steps a through c for all entries in the first equivalence set and all the entries in the second equivalence set.

6. The method of claim 2 further comprising the step of: associating each entry in the final equivalence set with one or more classes.

7. The method of claim 2 further comprising the step of: transferring the lookup tables and final equivalence set to a network device that performs packet classification.

8. A method for generating lookup tables, a final equivalence set and a results table for use in classifying a network packet in accordance with one or more match statements, the match statements being one of a stand-alone matching rule and a matching rule in an access control list (ACL) defining one or more matching rules, the method comprising the steps of:

generating a super class that contains all of the matching rules;

converting the matching rules of the super class into a single, hierarchical arrangement of lookup tables and equivalence sets, the hierarchical arrangement having a plurality of levels including a first level and a final level, the final equivalence set being associated with the equivalence set of the final level; and generating the results table from the entries in the final equivalence set.

9. The method of claim 8 wherein each entry in the final equivalence set is associated with an equivalence set index value and the step of generating the results table from the entries in the final equivalence set, comprises the step of:

associating the equivalence set index value with a result associated with the packet.

10. The method of claim 8 further comprising the step of: transferring the lookup tables and final equivalence set to a network device that performs packet classification.

11. A method for classifying a network packet in accordance with one or more match statements, the match statements being one of a stand-alone matching rule and a matching rule in an access control list (ACL) defining a plurality of matching rules, the method comprising the steps of:

generating a super class that contains all of the matching rules;

converting the matching rules of the super class into a single, hierarchical arrangement of lookup tables, the hierarchical arrangement having a plurality of levels including a first level and a final level, a final equivalence set being associated with the final level;

generating a results table from entries in the final equivalence set;

applying the network packet to the lookup tables to generate an outcome index; and applying the outcome index to the results table to determine a result that applies to the network packet.

12. The method of claim 11 wherein the result is a pointer to a class associated with the network packet.

13. The method of claim 11 wherein the result is a pointer to a matching rule associated with the network packet.

14. The method of claim 11 further comprising the step of: dividing the network packet into a plurality of sections.

15. A network device for classifying a network packet in accordance with one or more match statements, the match statements being one of a stand-alone matching rule and a matching rule in an access control list (ACL) defining a plurality of matching rules, the network device comprising:

means for generating a super class that contains all of the matching rules;

means for converting the matching rules of the super class into a single, hierarchical arrangement of lookup tables and equivalence sets, the hierarchical arrangement having a plurality of levels including a first level and a final level, a final equivalence set being associated with the final level;

means for generating a results table from entries in the final equivalence set;

means for applying the network packet to the lookup tables associated with the first level to generate an outcome index; and means for applying the outcome index to the results table to determine a result that applies to the network packet.

16. A method for generating lookup tables, the method comprising the steps of:

generating a super class that contains a plurality of matching rules for sorting incoming packets into classes;

converting the plurality of matching rules of the super class into a single, hierarchical arrangement of lookup tables and equivalence sets; and generating a final lookup table in response to the hierarchical arrangement of lookup tables and equivalence sets.

17. The method of claim 16 further comprising the step of: transferring the lookup tables and the equivalence sets to a network device that performs packet classification.

18. An apparatus for generating lookup tables, comprising:

means for generating a super class that contains a plurality of matching rules for sorting incoming packets into classes;

means for converting the plurality of matching rules of the super class into a single, hierarchical arrangement of lookup tables and equivalence sets; and means for generating a final lookup table in response to the hierarchical arrangement of lookup tables and equivalence sets.

19. The apparatus claim 18 further comprising:

means for transferring the lookup tables and the equivalence sets to a network device that performs packet classification.

20. A system for generating lookup tables, comprising:

a processor configured to generate a super class that contains a plurality of matching rules for sorting incoming packets into classes;

the processor further configured to convert the plurality of matching rules of the super class into a single, hierarchical arrangement of lookup tables and equivalence sets;

the processor further configured to generate a final lookup table in response to the hierarchical arrangement of lookup tables and equivalence sets; and a memory coupled to the processor, the memory configured to store the final lookup table.

21. A computer readable media comprising:

the computer readable media containing computer executable instructions for execution in a processor for the practice of generating lookup tables, comprising, generating a super class that contains a plurality of matching rules for sorting incoming packets into classes;

converting the plurality of matching rules of the super class into a single, hierarchical arrangement of lookup tables and equivalence sets; and generating a final lookup table in response to the hierarchical arrangement of lookup tables and equivalence sets.

22. An apparatus for generating lookup tables, a final equivalence set and a results table for use in classifying a network packet in accordance with one or more match statements, the match statements being one of a stand-alone matching rule and a matching rule in an access control list (ACL) defining a plurality of matching rules, comprising:

a processor;

a memory coupled to the processor; and means for generating a super class that contains all of the matching rules;

whereby the processor is configured to a) convert the matching rules of the super class into a single, hierarchical arrangement of lookup tables and equivalence sets, the hierarchical arrangement having a plurality of levels including a first level and a final level, the final equivalence set being associated with the final level, b) place the lookup tables and final equivalence set in the memory, and c) generate the results table from entries in the final equivalence set.

23. The apparatus of claim 22 further comprising:

a content-addressable memory (CAM);

whereby the processor is configured to place the lookup tables in the CAM.

24. A computer readable media containing computer executable instructions for execution in a processor for generating lookup tables, a final equivalence set and a results table for use in classifying a network packet in accordance with one or more match statements, the match statements being one of a stand-alone matching rule and a matching rule in an access control list (ACL) defining one or more matching rules, the instructions adapted for:

generating a super class that contains all of the matching rules;

converting the matching rules of the super class into a single, hierarchical arrangement of lookup tables and equivalence sets, the hierarchical arrangement having a plurality of levels including a first level and a final level, the final equivalence set being associated with the equivalence set of the final level; and generating the results table from the entries in the final equivalence set.

25. A computer readable media containing computer executable instructions for execution in a processor for classifying a network packet in accordance with one or more match statements, the match statements being one of a stand-alone matching rule and a matching rule in an access control list (ACL) defining a plurality of matching rules, the instructions adapted for:

generating a super class that contains all of the matching rules;

converting the matching rules of the super class into a single, hierarchical arrangement of lookup tables, the hierarchical arrangement having a plurality of levels including a first level and a final level, a final equivalence set being associated with the final level;

generating a results table from entries in the final equivalence set;

applying the network packet to the lookup tables to generate an outcome index; and applying the outcome index to the results table to determine a result that applies to the network packet.

* * * * *